(12) United States Patent
Nayaknur

(10) Patent No.: US 12,512,764 B2
(45) Date of Patent: Dec. 30, 2025

(54) CROSS CONDUCTION PREVENTION IN POWER CONVERTERS

(71) Applicant: POWER INTEGRATIONS, INC., San Jose, CA (US)

(72) Inventor: Akshay Nayaknur, Sunnyvale, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 287 days.

(21) Appl. No.: 18/140,470

(22) Filed: Apr. 27, 2023

(65) Prior Publication Data

US 2024/0283369 A1 Aug. 22, 2024

Related U.S. Application Data

(60) Provisional application No. 63/446,388, filed on Feb. 17, 2023.

(51) Int. Cl.
*H02M 3/335* (2006.01)
*H02M 1/38* (2007.01)

(52) U.S. Cl.
CPC ......... *H02M 3/33592* (2013.01); *H02M 1/38* (2013.01); *H02M 3/33507* (2013.01)

(58) Field of Classification Search
CPC . H02M 1/38; H02M 3/33507; H02M 3/33592
See application file for complete search history.

(56) References Cited

U.S. PATENT DOCUMENTS 10,910,954 B1 2/2021 Shah et al.
2011/0090725 A1 4/2011 Lu
2017/0222568 A1* 8/2017 Choi ................. H02M 3/33592
2017/0222569 A1* 8/2017 Choi ................. H02M 3/33592
2017/0244333 A1* 8/2017 Choi ..................... H02M 1/08
2023/0275523 A1 8/2023 Jinyuan et al.

FOREIGN PATENT DOCUMENTS

CN 113992019 A 1/2022
WO WO-2021183882 A2 * 9/2021 .......... H02M 1/0058

OTHER PUBLICATIONS

European Application No. 24157748.5; "Extended European Search Report"; mailed Jul. 8, 2024; 8 pages.

* cited by examiner

*Primary Examiner* — Harry R Behm

(57) ABSTRACT

A controller for a power converter includes a primary controller and a secondary controller. The primary controller is coupled to a primary winding of the energy transfer element and a primary switch of the power converter. The secondary controller is coupled to a secondary winding of the energy transfer element and a secondary switch, e.g., a synchronous rectifier, of the power converter. The secondary controller has a synchronous rectifier control/drive circuit, a control logic circuit, and a cross conduction detector circuit. Cross conduction is when the primary switch turns on when the secondary switch is active. The cross-conduction detector circuit produces a Disable SR signal when cross conduction event detected. The cross-conduction detector circuit detects zero voltage switching cross conduction event and a minimum conduction period cross conduction event. The SR drive circuit disables the synchronous rectifier in response to receiving the Disable SR signal.

17 Claims, 9 Drawing Sheets

CROSS CONDUCTION PREVENTION IN POWER CONVERTERS

CROSS-REFERENCE TO RELATED APPLICATIONS

This application claims benefit of U.S. Provisional Application No. 63,446,388, filed Feb. 17, 2023, which is incorporated by reference in its entirety.

BACKGROUND OF THE INVENTION

Field of the Disclosure

The present invention relates generally to controlling a power converter. More specifically, examples of the present invention are related to controlling switch mode power converters.

Discussion of the Related Art

Switch mode power converters are widely used for household or industrial appliances that require a regulated direct current (dc) source for their operation, such as for example battery chargers that are commonly used in electronic mobile devices. Off-line ac-dc converters convert a low frequency (e.g., 50 Hz or 60 Hz) high voltage alternating current (ac) input voltage to a required level of dc output voltage. Various types of switch mode power converters are popular because of their well-regulated output, high efficiency, and small size along with their safety and protection features. Popular topologies of switch mode power converters include flyback, forward, boost, buck, half bridge, and full bridge, among many others including resonant types.

Some switch mode power converters, such as a synchronous switch mode power converter, may include a primary switch on the primary side of the power converter and a second switch, such as a switch of a synchronous rectification circuit, on the secondary side of the power converter. The primary switch may be switched between an ON state (i.e., closed switch) and an OFF state (i.e., open switch) to control the energy transfer between the input and the output of the power converter. The secondary switch may be used to increase the efficiency with which the energy is transferred to the output of the power converter when the first switch is switched to the OFF state. In operation, the secondary switch may be switched between the ON state and the OFF state in coordination with the primary switch such that both switches are not in ON state simultaneously to prevent cross-conduction, a condition where the power converter attempts to provide energy to a short circuit at the output that may lead to a reduction in the efficiency of the power converter.

To avoid cross conduction, the drive signals for the switches include a small amount of "dead time" between the period when the primary switch turns off and the secondary switch turns on. Increasing the dead time helps protect the switches but it also creates another type of loss that occurs when both switches are off that reduces the power converter's efficiency and lowers the available duty cycle range. As a result, minimizing the drive signals' dead time while ensuring no cross conduction occurs is a key design goal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
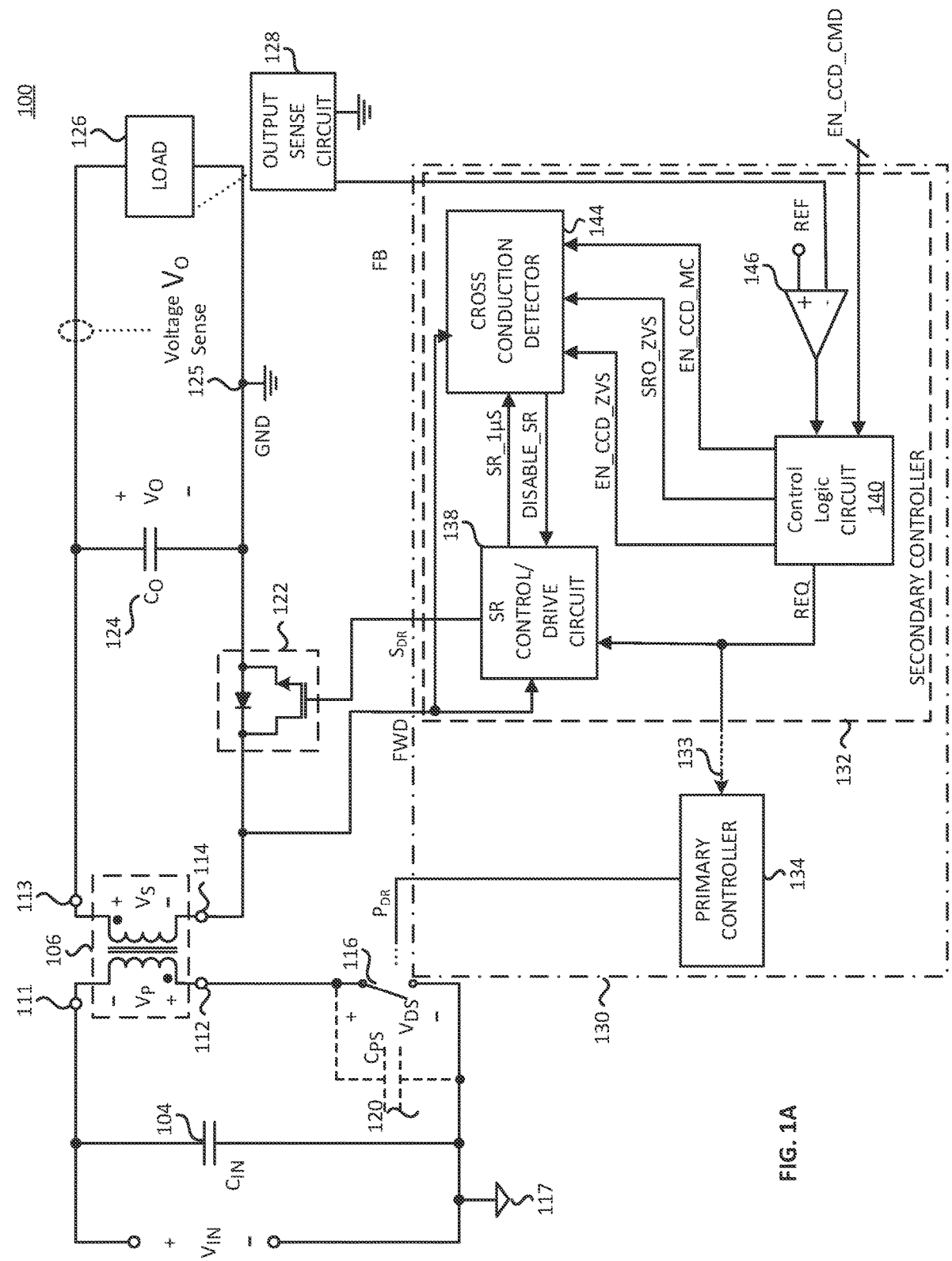
FIG. 1A illustrates an example functional block diagram of a power converter in a flyback configuration that uses a cross conduction detector circuit for detecting cross conduction and disabling the secondary switch in accordance with teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments of the present invention.

DETAILED DESCRIPTION

In the following description, numerous specific details are set forth to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that either a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. The particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For illustrative purposes, the below description describes the power converter using positive logic polarity. Those of ordinary skill in the art can extend the inventive concept to use negative logic polarity.

For illustrative purposes, it is noted that the below description discusses a power converter may be used to provide output voltage and current for the purposes of providing energy to a battery powered product. It is appreciated, however, that the present invention may be applied in general to any power converter.

In various examples described herein, when the secondary switch is conducting and the primary switch turns on, there is a cross conduction event. This can be detected by looking at the forward FWD voltage.

In a flyback converter having galvanic isolation, e.g., no current flow between the primary side and the secondary side, energy or information is exchanged by other means. For a flyback converter controlled by the secondary side, information about the primary side may be extrapolated by monitoring the FWD node 114. The FWD node 114 proportionally tracks the voltage going across the primary switch. During normal operation, when the primary switch begins to conduct and the secondary switch is non-conductive or open, the voltage on the forward node 114 increases. When the primary switch is non-conductive and the secondary switch is conducting, the voltage on the forward node is below reference ground. When neither switch is conductive, there is ringing on primary switch and the voltage on the FWD node 114 tracks the voltage on the primary switch.

When a cross conduction event occurs, both the primary switch and the secondary switch are conducting and increasing the voltage on the FWD node 114. This event potentially damages the transistors. The disclosed cross conduction detector circuit detects the state of the secondary switch and the rise in voltage on the FWD node 114. This condition is considered a cross conduction event and a disable signal is sent to the secondary switch.

Figure 1B:
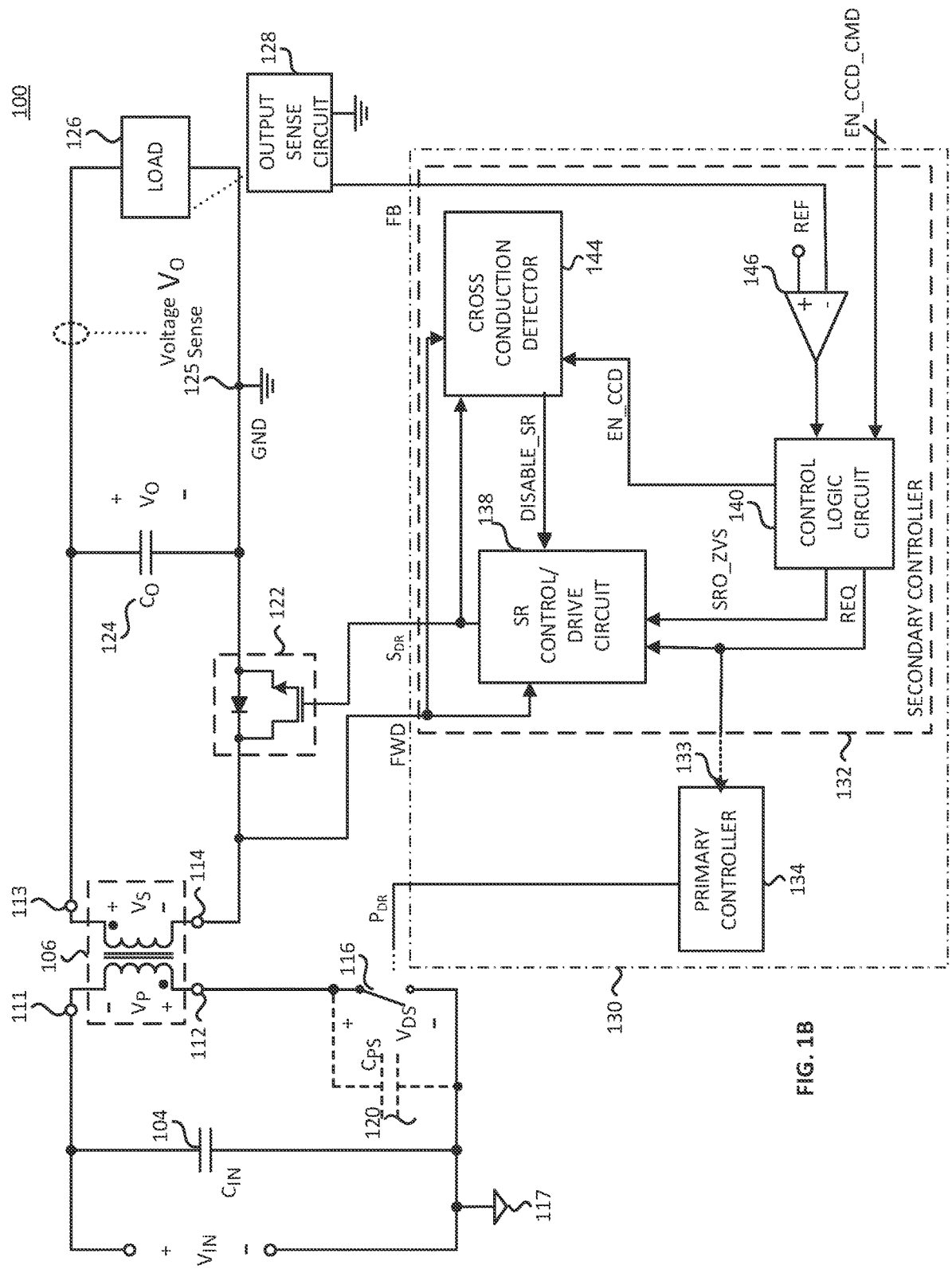
FIG. 1B illustrates another example functional block diagram of a power converter in a flyback configuration that uses a cross conduction detector circuit for detecting cross conduction and disabling the secondary switch in accordance with teachings of the present invention.
Figure 1C:
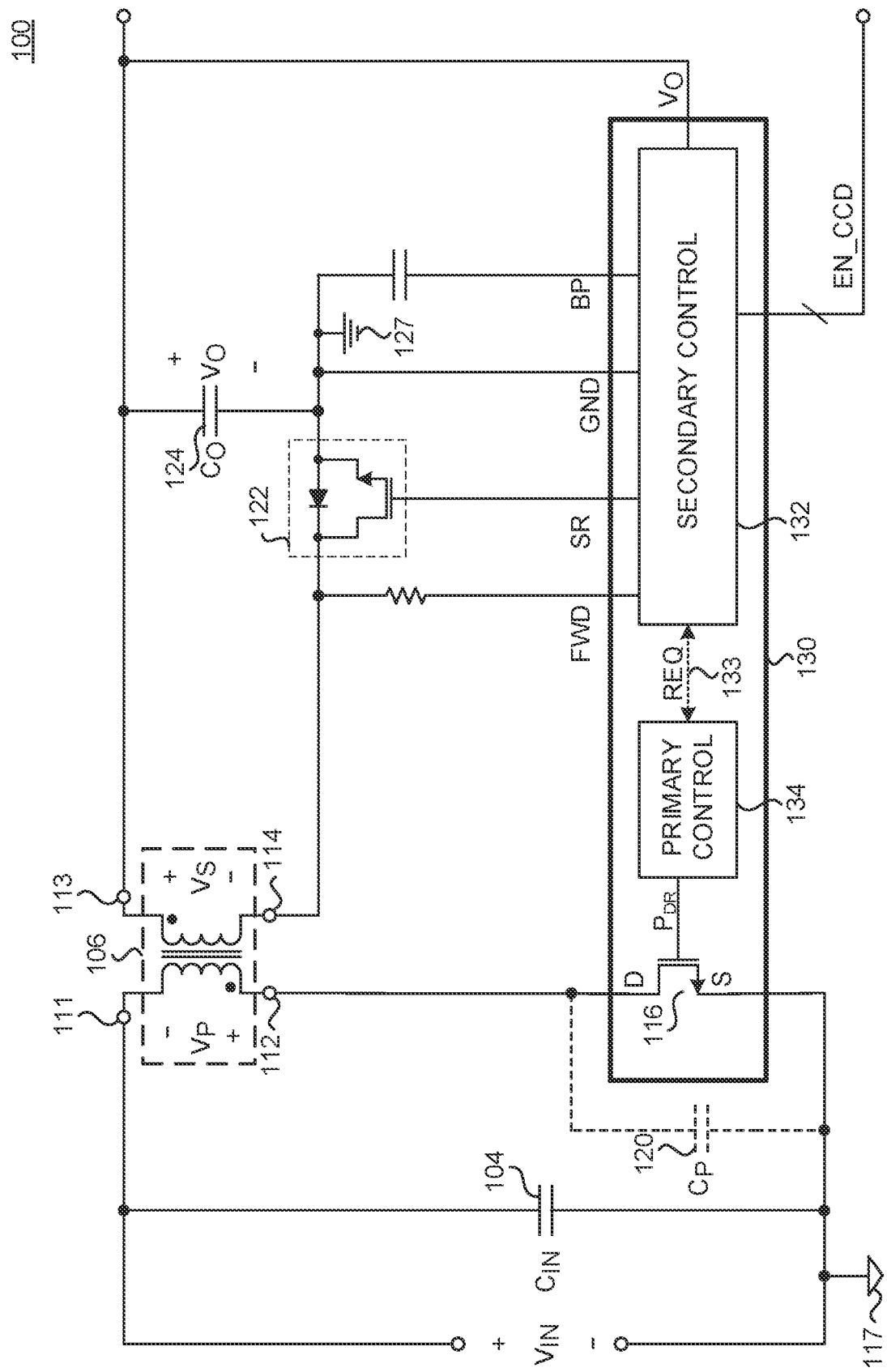
FIG. 1C illustrates a circuit schematic of the power converter in a flyback configuration shown in FIG. 1A or in FIG. 1B with the cross-conduction detector circuit and control circuits contained within an integrated circuit package.

FIG. 1A illustrates an example functional block diagram of a power converter in a flyback configuration that uses a cross conduction detector circuit for detecting cross conduction and disabling the secondary switch in accordance with teachings of the present invention. FIG. 1B illustrates another example functional block diagram of a power converter in a flyback configuration that uses a cross conduction detector circuit for detecting cross conduction and disabling the secondary switch in accordance with teachings of the present invention. FIG. 1C illustrates a circuit schematic of the power converter in a flyback configuration shown in FIG. 1A or in FIG. 1B with the cross-conduction detector circuit and control circuits contained within an integrated circuit package.

The power converter 100 may be used to provide energy to an electronic device, e.g., a battery powered product. The effective drain capacitance Cps 120, which is illustrated in dashed lines, represents all the capacitance that is effectively coupled across the power switch 116. The capacitance Cps 120 may include the inherent capacitance that is internal to the energy transfer element, energy transfer element T1 106, as well as the inherent internal capacitance of the power switch 116. The capacitance Cps 120 may also represent discrete capacitors placed intentionally in various parts of the circuit to filter noise and to slow transitions of switching voltages.

In the illustrated examples, the power converter 100 also includes a primary controller 134 and a secondary controller 132. The primary controller 134 controls the switching of the primary switch 116, while the secondary controller 132 controls the switching of a secondary switch, e.g., a synchronous rectifier (SR) 122. The primary controller 134 and secondary controller 132 may communicate via a galvanically isolated communication link 133.

The primary controller 134 and secondary controller 132 may be formed as part of an integrated circuit that is manufactured as either a hybrid or monolithic integrated circuit (such as in a non-isolated flyback converter), as shown as controller 130. In one example, the primary switch 116 may also be integrated in a single integrated circuit package with controller 130. In another example, the cross-conduction detector circuit 144 may be integrated in a single integrated circuit package with controller 130. It should be appreciated that both the primary controller and the secondary controller need not be included in a single controller package and may be implemented in separate controller packages. Further, the primary controller 134 and the secondary controller 132 may be formed as separate integrated circuits.

The enable cross conduction command signal may be values stored into a register by trimming external components or received signals through communication links such as an inter-integrated circuit (I2C) bus.

FIG. 1A and FIG. 1B are examples of the secondary controller 132 that may include a SR Control/Drive Circuit 138 and a cross conduction detector circuit 144. A comparator 146 receives the feedback signal FB (representing the output quantity $U_O$) and compares it to the reference to produce a request. The request indicates that the primary switch 116 should be turned on. The output quantity $U_O$ may represent the output voltage $V_O$ of the power converter 100. In response to the request, the Control Logic circuit 140 produces a REQ signal. The REQ signal selects when to enable the primary switch 116. The SR Control/Drive Circuit 138 receives the REQ signal and produces drive signal $S_{DR}$ that enables the secondary switch 122. The secondary switch 122 may be a synchronous rectifier SR. In one example, the drive signal $S_{DR}$ is a digital waveform where a rising edge in the drive signal $S_{DR}$ corresponds to enabling the secondary switch 122 to turn ON.

The sense circuit 128 detects the output voltage $V_o$ across capacitor $C_o$ 124. The sense circuit produces the feedback signal FB which represents the output quantity $U_o$ The SR Control/Drive circuit 138 is coupled to the FWD node 114 of the energy transfer element 106, the synchronous rectifier 122, the cross-conduction detector circuit 144, and the Control Logic Circuit 140.

The cross-conduction detector circuit 144 is coupled to the FWD node 114, the SR Control/Drive Circuit 138, and the Control Logic Circuit 140.

In FIG. 1A, the enable cross conduction detection signal, e.g., EN_CCD_ZVS or EN_CCD_MC is received from the Control Logic Circuit 140. This example provides for enabling the cross-conduction detector circuit 144 based on the type of cross conduction event. In FIG. 1B, the enable cross conduction detection signal, e.g., EN_CCD is received from the Control Logic Circuit 140. This example provides for enabling the cross-conduction detector circuit 144 based on both the minimum conduction period event and a zero voltage ZVS event.

In operation for FIG. 1A, the cross-conduction detector circuit 144 turns on when an enable cross conduction detection signal, e.g., EN_CCD_ZVS or EN_CCD_MC, is active. The cross-conduction detector circuit 144 detects when the primary switch 116 is ON by monitoring the voltage on the FWD node 114, e.g., FWD voltage. When the FWD voltage rises above a predetermined threshold after the request signal REQ and SR 122 is enabled, the cross-conduction detector circuit 144 produces a DISABLE_SR signal. The SR Control/Drive Circuit 138 receives the DISABLE_SR signal and turns off the synchronous rectifier SR 122. The predetermined threshold may be selected based on the operating parameters of the synchronous rectifier 122.

In FIG. 1A, when the cross-conduction detector circuit 144 receives the EN_CCD_MC signal, it looks for a cross conduction event may occur during the synchronous rectifier (SR)—secondary conduction time. After the primary switch 116 turns OFF, the SR 122 turns ON during the secondary conduction period. The SR 122 has a minimum conduction period, e.g., 1 microsecond. When the FWD voltage rises above reference ground, the SR 122 is turned off. When cross conduction event occurs, e.g., the primary switch 116 is ON, the cross-conduction detector circuit 144 will disable the SR 122 during the minimum SR-secondary conduction time. Under normal operation, the FWD node 114 voltage is less than reference ground during the minimum conduction period. When the cross-conduction event occurs, the FWD voltage rapidly increases above reference ground. The FWD voltage is compared to a predetermined threshold. The predetermined threshold has been selected such that the SR 122 is only disabled during the cross-conduction event.

In FIG. 1A, when the cross-conduction detector circuit 144 receives the EN_CCD_ZVS signal, it looks for a cross conduction event may occur during the SR-ZVS-ON time. During the normal operation for SR-ZVS-On time, the FWD voltage is above reference ground. When cross conduction event occurs, e.g., the primary switch 116 is ON, the FWD voltage rapidly increases. The FWD voltage is compared to a predetermined threshold. The predetermined threshold has been selected such that the SR 122 is only disabled during the cross-conduction event.

In FIG. 1B, the enable cross conduction detection signal, e.g., EN_CCD is received from the Control Logic circuit 140.

In operation, the cross-conduction detector circuit 144 turns on when an enable cross conduction detection signal, e.g., EN_CCD, is received. The cross-conduction detector circuit 144 detects when the primary switch 116 is ON by monitoring the FWD voltage on the FWD node 114. When the FWD voltage rises above a predetermined threshold after the request signal REQ and SR 122 is enabled, the cross-conduction detector circuit 144 produces a DISABLE_SR signal. The SR Control/Drive Circuit 138 receives the DISABLE_SR signal and turns off the secondary switch SR 122. The predetermined threshold may be selected based on the operating parameters of the synchronous rectifier.

When the cross-conduction detector circuit 144 receives the EN_CCD signal, it looks for a cross conduction event that may occur during the synchronous rectifier (SR)—any secondary conduction time. When cross conduction occurs, e.g., the primary switch 116 is ON, e.g., the FWD voltage rapidly increases above reference ground 125, the cross-conduction detector circuit 144 will disable the SR 122. The FWD voltage is compared to a predetermined threshold. The predetermined threshold has been selected such that the SR 122 is only disabled during the cross-conduction event.

Figure 2:
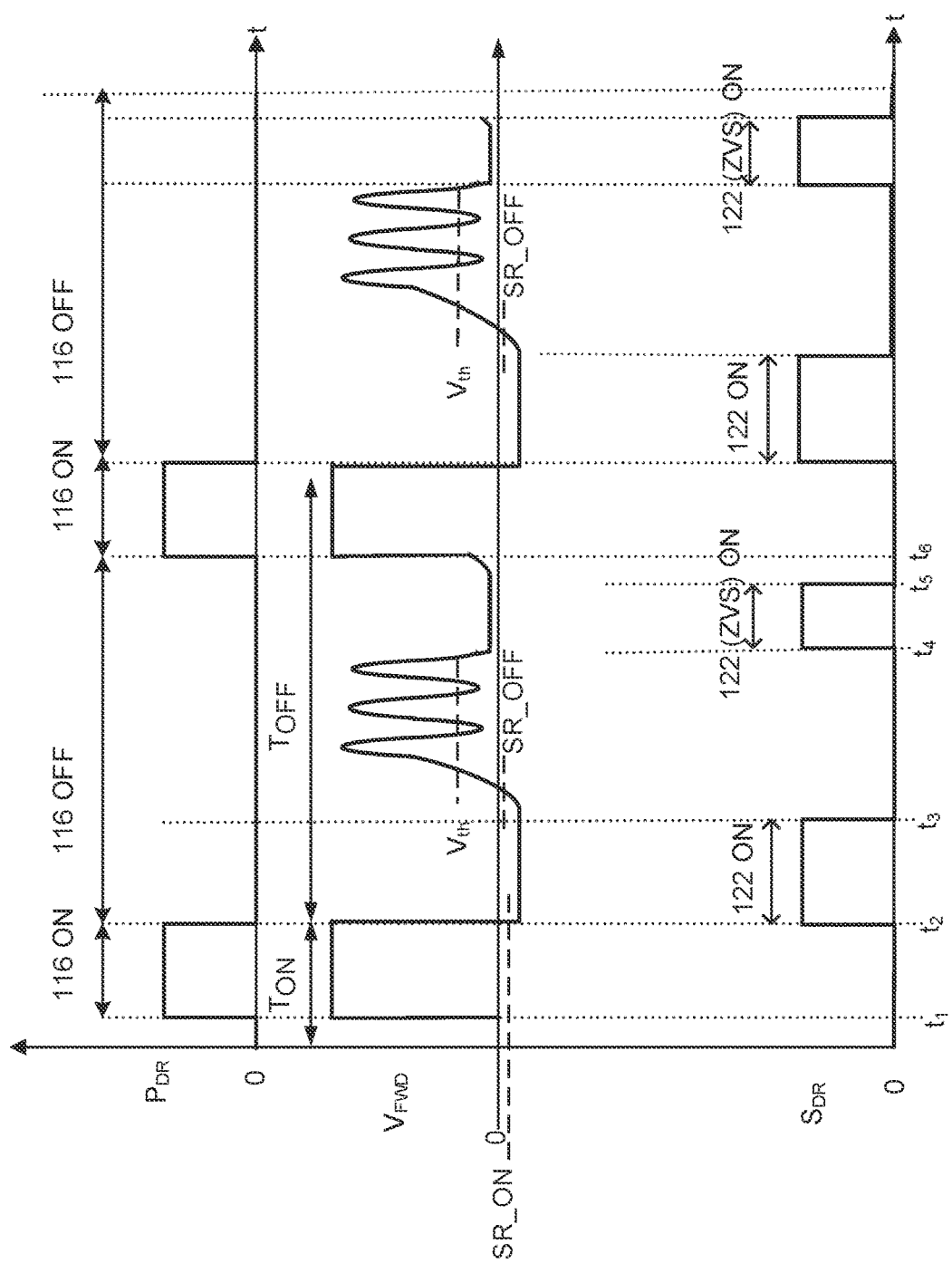
FIG. 2 shows an example timing diagram that illustrates example waveforms of a primary drive signal, a secondary drive signal, and a FWD voltage found in an example power converter.

FIG. 2 shows an example timing diagram 200 that illustrates the signal behavior of example waveforms of a primary drive signal PDR, FWD voltage, and the secondary drive signal $S_{DR}$. A cycle of the example waveforms is shown between time intervals $t_1$-$t_6$.

During the time interval $t_1$ to $t_2$, the primary drive signal PDR places the primary switch 116 in conducting mode. The synchronous rectifier 122 is not conducting and the voltage across the FWD node 114 is high.

During the time interval $t_2$ to $t_3$, when the synchronous rectifier 122 conducts, the FWD voltage is below reference ground 125.

During the time interval $t_3$ to $t_4$, neither the primary drive signal PDR nor the secondary drive signal $S_{DR}$ are asserted. The power converter is in discontinuous conduction mode. There may be a ringing voltage from the resonance between capacitance at the drain node of the primary power switch and the inductance of the energy transfer element.

During the time interval $t_4$ to $t_5$, the secondary drive signal $S_{DR}$ may be asserted to achieve zero voltage switching ZVS of the primary switch.

During the time intervals when the secondary switch 122 is conducting, e.g., time interval $t_2$ to $t_3$ and $t_4$ to $t_5$, if the primary switch 116 is turned on, a cross conduction event can occur.

Figure 3:
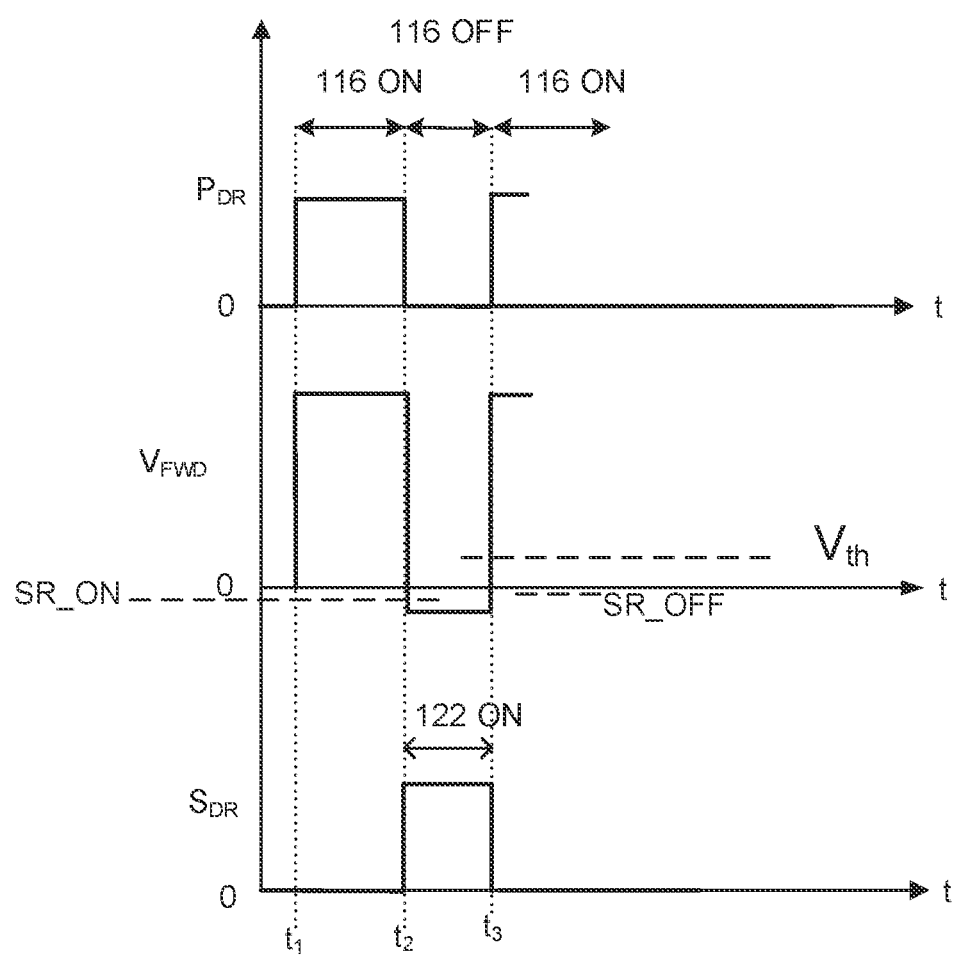
FIG. 3 illustrates a timing diagram of one example of the cross-conduction detector circuit in accordance with teachings of the present invention.

FIG. 3 shows an example timing diagram 300 that illustrates example waveforms of a primary drive signal PDR, the FWD voltage, and secondary drive signal $S_{DR}$ during a cross conduction event. A cycle of the example waveforms is shown between time intervals $t_1$-$t_3$.

During the time interval $t_1$ to $t_2$, the primary drive signal PDR places the primary switch 116 in conducting mode. The secondary switch 122 is not conducting and the FWD voltage at the FWD node 114 is high.

During the time interval $t_2$ to $t_3$, when the synchronous rectifier 122 at the secondary side conducts (indicated by the secondary drive signal $S_{DR}$), the FWD voltage is below reference ground 125.

At time $t_3$, the FWD voltage at the FWD node 114 increases rapidly. This rapid increase is indicative of the primary switch 116 being in a conductive state. This is a cross conduction event. The SR Control/Drive circuit 138 is turned off.

Figure 4:
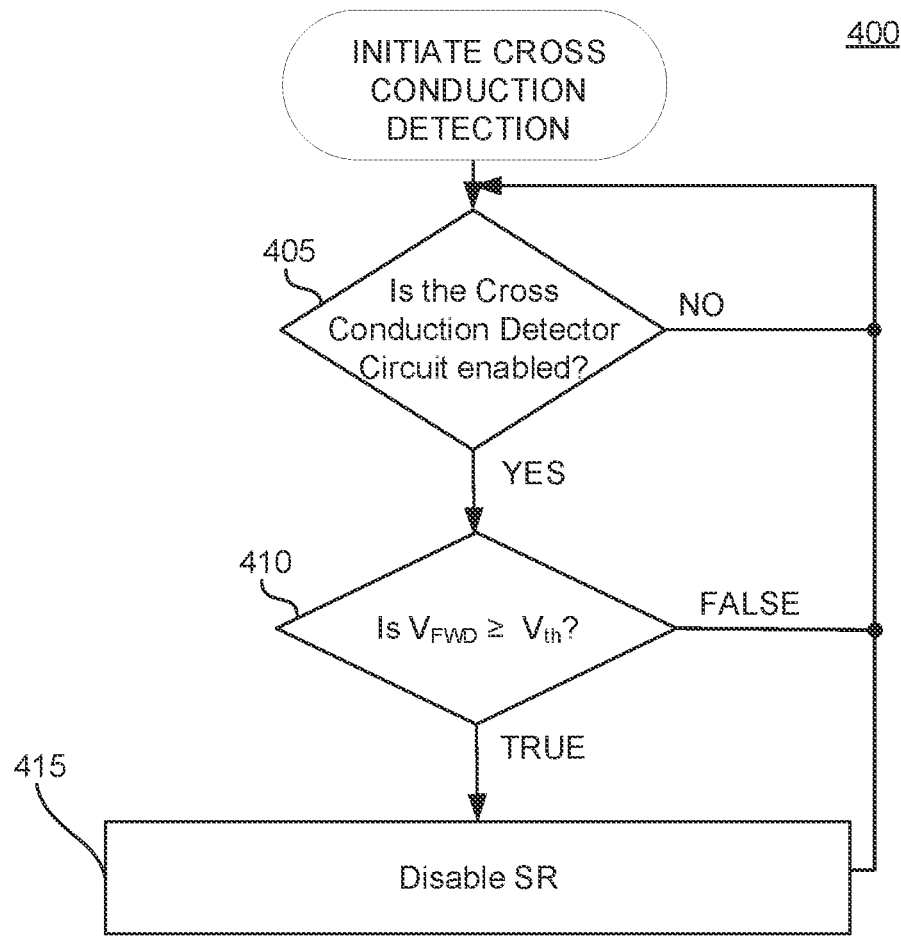
FIG. 4 illustrates an example of a flow diagram 400 for the decision process for detecting a cross conduction event.

FIG. 4 illustrates an example of a flow diagram 400 for the decision process of detecting a cross conduction event.

In step 405, it is determined if the cross-conduction detector circuit 144 is enabled. If no, repeat step 405. If yes, in step 410, check if the FWD voltage is greater than or equal to $V_{th}$. If false, repeat from step 405. If true, in step 415, disable the SR 122.

Figure 5:
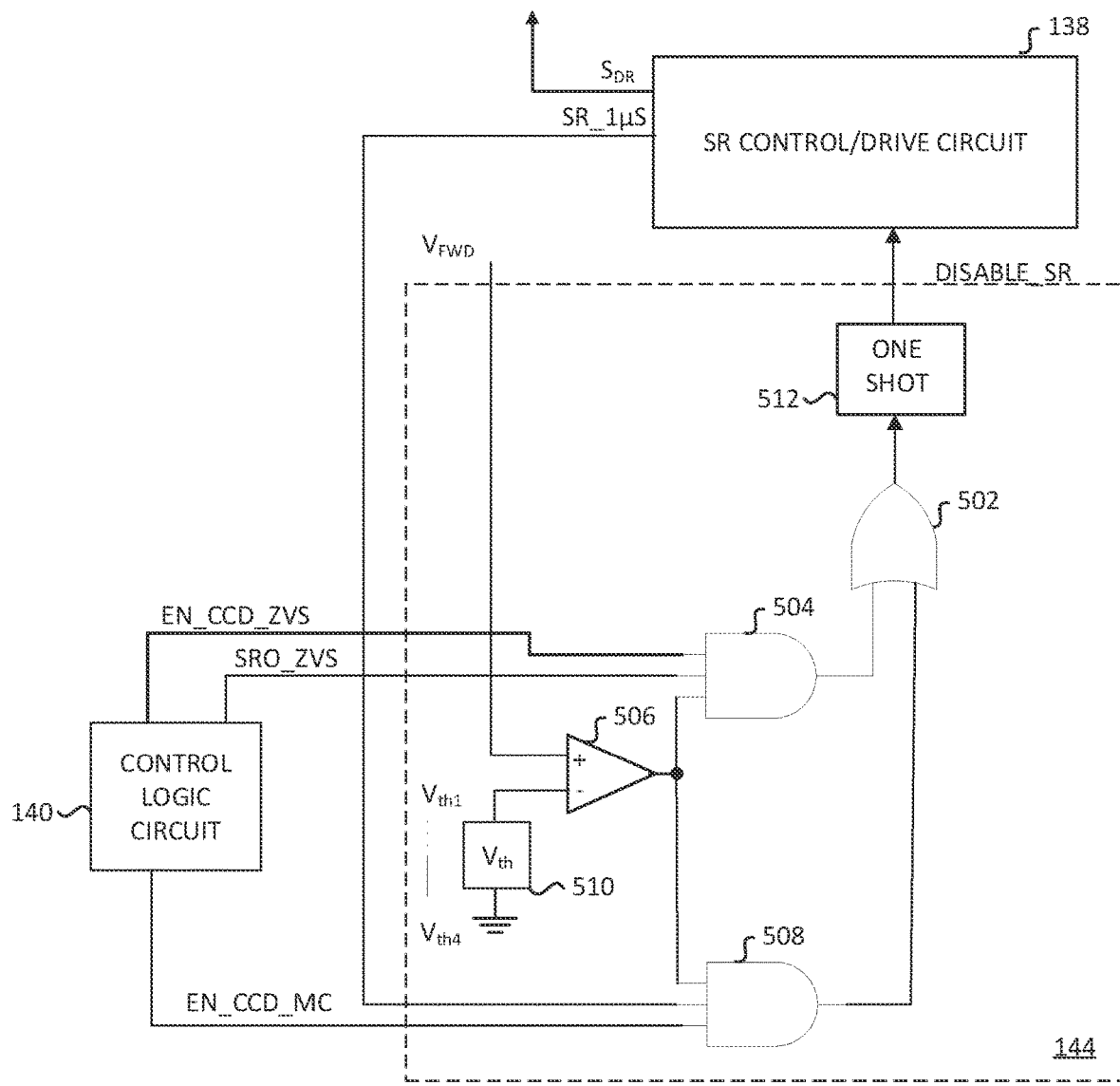
FIG. 5 illustrates a logical diagram for the coupling of the cross-conduction detector circuit 144 to the SR Drive Circuit 138 and to the Control Logic Circuit 140 as exemplified in FIG. 1A.

FIG. 5 illustrates a logical diagram for the coupling of the cross-conduction detector circuit 144 to the SR Drive Circuit 138 and to the Control Logic Circuit 140 as exemplified in FIG. 1A.

In this example, the detection of the cross-conduction event is dependent upon the type of cross conduction event to be detected and the value of the FWD voltage. The cross-conduction detector circuit 144 includes a comparator 506, two AND gates 504, 508, an OR gate 502, and a monostable multivibrator (e.g., one shot) 512.

The comparator 506 includes at least one threshold voltage coupled to its inverting input and the FWD node 114 coupled to its non-inverting input. A DC reference 510 is coupled between the inverting input and reference ground 125. These threshold voltages are based on the operating parameters of the synchronous rectifier 122. The output of comparator 506 indicates when the FWD node 114 has a voltage greater than the threshold voltage.

The first AND gate 504 has a first input and a second input coupled to the Control Logic Circuit 140 and a third input coupled to the output of the comparator 506. The Control Logic Circuit 140 provides an EN_CCD_ZVS signal and a SRO_ZVS signal. These signals enable the cross-conduction detector circuit 144 to detect a cross conduction event during zero voltage switching ZVS of the primary switch using the synchronous rectifier 122.

The second AND gate 508 has a first input coupled to the output of the comparator 506, second input coupled to the Control Logic Circuit 140, and a third input coupled to the SR Control/Drive Circuit 138. The Control Logic Circuit 140 provides a EN_CCD_MC signal and the SR Control/Drive Circuit 138 provides a SR_luS signal. These signals enable the cross-conduction detector circuit 144 to detect a cross conduction event during the minimum conduction period of the synchronous rectifier 122.

The OR gate 502 has inputs coupled to the outputs of the first and the second AND gates 504, 508. When one of the selected cross conduction events has been detected, the output of the OR gate 502 is asserted. The one shot 512 is coupled to the output of the OR gate 502 and outputs the DISABLE_SR signal in response to the leading edge of the output of the OR gate 502. In response to receiving an asserted DISABLE_SR signal, the SR Control/Drive Circuit 138 turns off the synchronous rectifier 122.

Figure 6:
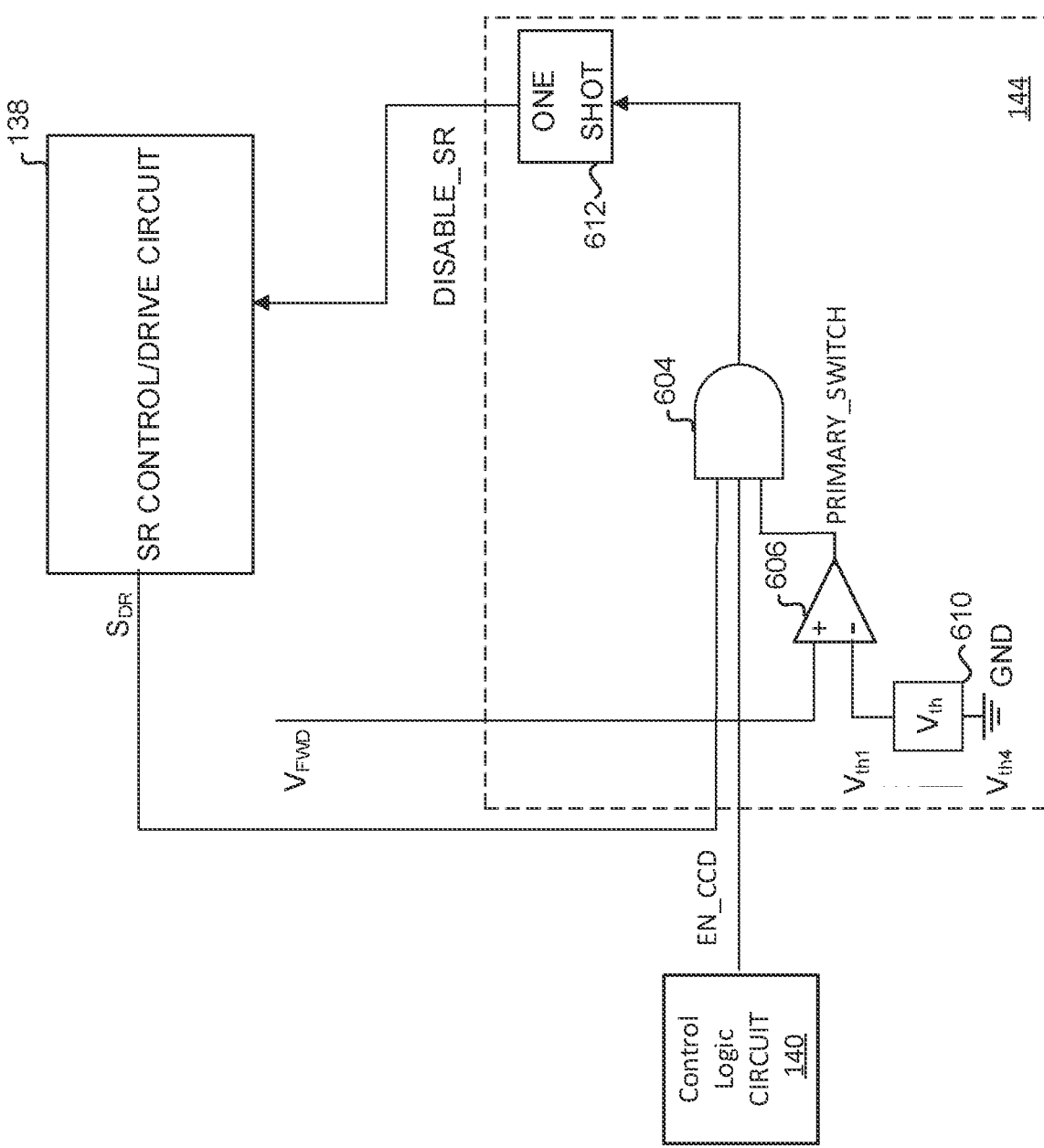
FIG. 6 illustrates a logical diagram for the coupling of the cross-conduction detector circuit 144 to the SR Drive Circuit 138 as exemplified in FIG. 1B.

FIG. 6 illustrates a logical diagram for the coupling of the cross-conduction detector circuit 144 to the SR Drive Circuit 138 as exemplified in FIG. 1B.

In this example, cross conduction detection is event type independent. The cross-conduction detector circuit 144 includes a comparator 606, an AND gate 604, and a monostable multivibrator (e.g., one shot) 612.

The comparator 606 includes at least one threshold voltage coupled to its inverting input and the FWD node 114 coupled to its non-inverting input. A DC reference 610 is coupled between the inverting input and reference ground 125. These threshold voltages are based on the operating parameters of the synchronous rectifier 122. The output of comparator 606 indicates when the FWD node 114 has a voltage greater than the threshold voltage.

The AND gate 604 has a first input coupled to the SR Control/Drive Circuit 138, a second input coupled to the Control Logic circuit 140, and a third input coupled to the output of the comparator 606. The SR Control/Drive Circuit 138 provides a $S_{DR}$ signal that enables the cross-conduction detector circuit 144 to detect cross conduction events that occur when the synchronous rectifier 122 is conducting. The output of AND gate 604 indicates the detection of a cross conduction event. The one shot 612 is coupled to the output of the AND gate 604 and outputs the DISABLE_SR signal in response to the leading edge of the output of the AND gate 604. In response to receiving an asserted DISABLE_SR signal, the SR Control/Drive Circuit 138 turns off the synchronous rectifier 122.

Figure 7:
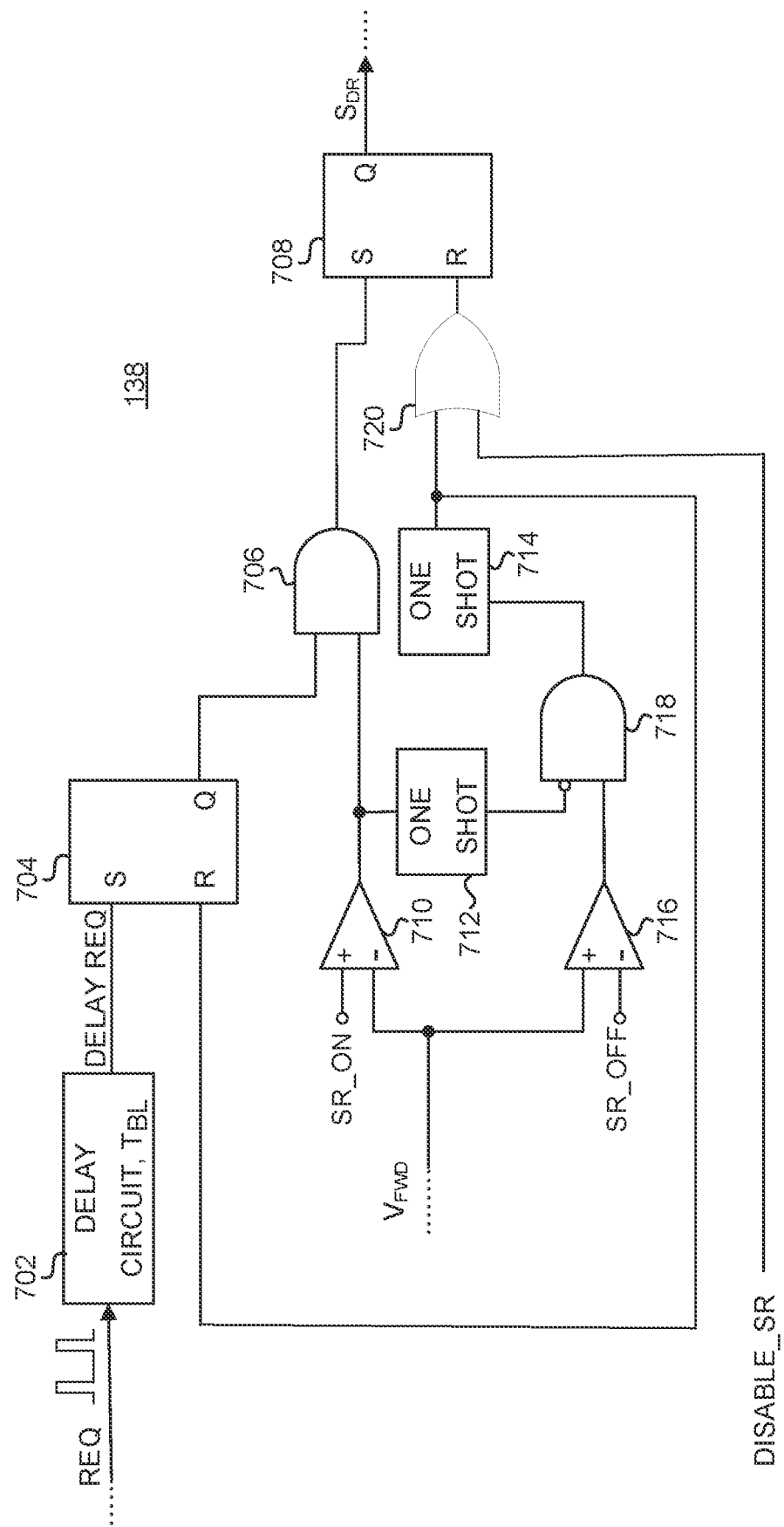
FIG. 7 illustrates one example of SR Drive Circuit 138 for controlling the turn ON and turn OFF of the secondary switch 122, in accordance with embodiment of FIG. 1A.

FIG. 7 illustrates one example of SR Control/Drive Circuit 138 for controlling the turn ON and turn OFF of the secondary switch 122, in accordance with embodiments of the present disclosure. The SR Control/Drive circuit 138 is shown as including a delay circuit 702, comparator 710, comparator 716, AND gate 706, latch 704, latch 708, monostable multivibrator (e.g., one-shot) 712, monostable multivibrator (e.g., one shot) 714, AND gate 718, and OR gate 720.

SR Control/Drive circuit 138 is coupled to receive the voltage at the FWD node 114 and the request signal REQ. In response to the received signals, the SR Control/Drive circuit 138 outputs the secondary drive signal $S_{DR}$. The secondary drive signal $S_{DR}$ controls the turn ON and turn OFF the transistor of the secondary switch 122.

Comparator 710 is coupled to receive the FWD voltage at its inverting input and the turn-on threshold voltage SR_ON at its non-inverting input. The output of comparator 710 is high when the FWD voltage is less than the turn-on threshold voltage SR_ON and low when the FWD voltage is greater than the turn-on threshold voltage SR_ON. The output of comparator 710 is received by AND gate 706. The output of comparator 710 is further received by monostable multivibrator 712, also referred to as one-shot circuit 712.

Monostable multivibrator 712 is coupled to the output of comparator 710 and outputs a rectangular waveform. The rectangular waveform may have a duration of high sections substantially equal to the minimum conduction time of the secondary switch 122. In one example, once the secondary switch 122 is turned ON by the SR Control/Drive circuit 138, the secondary switch 122 is controlled ON for at least the minimum conduction time. In response to a leading edge in the output of comparator 710, e.g., FWD voltage falling below the turn-on threshold voltage SR_ON, the monostable multivibrator 712 outputs a rectangular waveform having a high duration substantially equal to the minimum conduction time. The output of the monostable multivibrator 712 is received by the AND gate 718. In particular, the AND gate 718 receives the inverted output of monostable multivibrator 712 as shown by the small circle at the input of AND gate 718.

Comparator 716 is coupled to receive the FWD voltage at its non-inverting input and the turn-off threshold voltage SR_OFF at its inverting input. The output of comparator 716 is high when the FWD voltage is greater than the turn-off threshold voltage SR_OFF and low when the FWD voltage is less than the turn-off threshold SR_OFF. The output of comparator 716 is received by the AND gate 718.

AND gate 718 is coupled to receive the inverted output of the monostable multivibrator 712 and the output of comparator 716. The output of AND gate 718 is received by the monostable multivibrator 714. In operation, a leading edge in the output of AND gate 718 occurs when the FWD voltage reaches the turn-off threshold voltage SR_OFF after at least a minimum conduction time has elapsed since the FWD voltage has fallen below the turn-on threshold voltage SR_ON. When the FWD voltage increases above the turn-off threshold voltage SR_OFF prior to the minimum conduction time elapsing, the leading edge of the output of AND gate 718 occurs substantially with the end of the minimum conduction time. When the FWD voltage increases above the turn-off threshold voltage SR_OFF after the minimum conduction time has elapsed, the leading edge of the output of AND gate 718 occurs substantially with the FWD voltage reaching the turn-off threshold voltage SR_OFF.

Monostable multivibrator 714 is coupled to receive the output of AND gate 718 and outputs a logic high pulse of a fixed duration in response to a leading edge in the output of AND gate 718. In other words, monostable multivibrator 714 outputs a logic high pulse of a fixed duration in response to the FWD voltage increasing above the turn-off threshold voltage SR_OFF after at least the minimum conduction time has elapsed. An OR gate 720 receives as inputs the output of monostable multivibrator 714 and the DISABLE_SR signal from the Cross Conduction Detector Circuit 144. The output of OR gate 720 is received at the R-input (e.g., reset-input) of latch 708. In operation, the latch 708 is reset and the secondary drive signal $S_{DR}$ transitions to a low value to turn OFF the secondary switch 122.

Delay circuit 702 is coupled to receive the request signal REQ and outputs a delayed request signal DELAY-REQ. For the example shown, the delay circuit 702 applies a delay time $T_{BL}$, also referred to as a blanking time $T_{BL}$, to the request signal REQ. When there is a request event in the request signal REQ, the delay circuit 702 outputs a delayed request signal DELAY_REQ in which the request event would occur a blanking time $T_{BL}$ after the received request event.

Latch 704 is coupled to receive the output of delay circuit 702 and the output of the monostable multivibrator 714. In particular, the latch 704 is coupled to receive the delayed request signal at its S-input (e.g., set-input) and the output of the monostable multivibrator at its R-input (e.g., reset-input). The Q-output of latch 704 is received by AND gate 706. In operation the latch 704 is set in response to a request event in the delayed request signal DELAY_REQ. In particular, the latch 704 is set after a blanking time $T_{BL}$ has elapsed after a received request event in the request signal REQ. In other words, the output of latch 704 is logic high after a blanking time $T_{BL}$ has elapsed after a received request event. Latch 704 is reset when the FWD voltage increases above the turn-off threshold voltage SR_OFF.

The AND gate 706 is coupled to receive the output of comparator 710 and the output of latch 704. Latch 708 is coupled to receive the output of AND gate 706. The Q-output of latch 708 is the secondary drive signal $S_{DR}$.

In operation, the AND gate 706 outputs a logic high value and sets the latch 708 when the FWD voltage falls below the turn-on threshold voltage SR_ON when at least a blanking time $T_{BL}$ has elapsed after a received request event. The latch 708 is prevented from being reset until the minimum conduction time of the secondary switch 122 has elapsed. If the FWD voltage reaches the turn-off threshold SR_OFF prior to the minimum conduction time elapsing, the latch 708 is reset substantially with the elapse of the minimum conduction time. If the FWD voltage reaches the turn-off threshold voltage SR_OFF after the minimum conduction time has elapsed, the latch 708 is reset substantially with the FWD voltage reaching the turn-off threshold SR_OFF. When latch 708 is set, the secondary drive signal $S_{DR}$ transitions to a high value to turn ON the secondary switch 122. Latch 708 is reset when the FWD voltages increases above the turn-off threshold voltage SR_OFF and the secondary drive signal $S_{DR}$ transitions to a low value to turn OFF the secondary switch 122. When the FWD voltage increases above the turn-off threshold voltage SR_OFF, latch 708 is reset to prevent the setting of latch 708 and the secondary drive signal $S_{DR}$ transitioning to a high value to turn ON the secondary switch 122 until the next received request event in the request signal REQ.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1. A controller for a power converter having an energy transfer element, a primary switch, and a synchronous rectifier has a secondary controller comprising, a control logic circuit, coupled to receive an enable cross conduction command signal, a synchronous rectifier (SR) control/drive circuit coupled to the synchronous rectifier, to the control logic circuit, and to a forward node of the energy transfer element to produce a SR signal, wherein the SR signal indicates that the synchronous rectifier is active, a cross conduction detector circuit coupled to the forward node, to the control logic circuit, and to the SR control/drive circuit, to detect the primary switch is conducting when a voltage at the forward node rises above a threshold voltage, and responsive to detection that the primary switch is conducting, produces a Disable_SR signal, wherein the SR control/drive circuit is further coupled to receive the Disable_SR signal and disable the synchronous rectifier.

Example 2. The controller of example 1, wherein the control logic circuit is coupled to the enable cross conduction command to produce an enable cross conduction detection signal; and the cross-conduction detector circuit further comprises, a comparator coupled to the forward node to receive the threshold voltage responsive to a voltage at the forward node rising above the threshold voltage to produce a comparator output signal, and an AND gate responsive to receiving the comparator output signal, the enable cross conduction detection signal, and the SR signal produces the Disable_SR signal.

Example 3. The controller of example 2, wherein the threshold voltage is selected based on operating parameters of the synchronous rectifier.

Example 4. The controller of example 1, wherein: the control logic circuit is coupled to the enable cross conduction command to produce a first enable cross conduction detection (CCD) signal, a second enable CCD signal, and a ZVS signal, wherein the first enable CCD signal enables detection of cross conduction during zero voltage switching of the primary switch using the synchronous rectifier (SR) and the second enable CCD signal enables detection of cross conduction during minimum conduction periods of the synchronous rectifier; and the cross-conduction detector circuit comprises, a comparator coupled to the forward node to receive the threshold voltage responsive to the voltage at the forward node rising above the threshold voltage to produce a comparator output signal, a first AND gate responsive to the comparator output signal, the first enable CCD signal, and the ZVS signal to produce a ZVS Disable signal, a second AND gate responsive to the comparator output signal, the second enable CCD signal, and the SR signal to produce a minimum conduction Disable_SR signal, and OR gate responsive to the ZVS disable signal and the minimum conduction Disable_SR signal to produce the Disable_SR signal.

Example 5. The controller of example 4 further comprises a primary controller coupled to a primary winding of the energy transfer element and to the control logic circuit, wherein the primary controller and the secondary controller are galvanically isolated.

Example 6. The controller of example 5, wherein the primary controller and the secondary controller are included in a monolithic integrated circuit.

Example 7. The controller of example 5, wherein the primary controller and the secondary controller are included in a single integrated circuit package.

Example 8. A system comprises an energy transfer element having a primary winding and a secondary winding; a synchronous rectifier (SR) coupled to a forward node of the secondary winding; a primary controller coupled to the primary winding; a primary switch coupled to the primary controller and to the primary winding; and a secondary controller coupled to the secondary winding and to the primary controller. The secondary controller comprises a control logic circuit, coupled to receive an enable cross conduction command, a synchronous rectifier (SR) control/drive circuit coupled to the synchronous rectifier, to the control logic circuit, and to the forward node, to produce a SR signal, wherein the SR signal indicates that the synchronous rectifier is active, a cross conduction detector circuit coupled to the forward node, to the control logic circuit, and to the SR control/drive circuit, to detect the primary switch is conducting when a voltage at the forward node rises above a threshold voltage, and responsive to detection that the primary switch is conducting, produces a Disable_SR signal, wherein the SR control/drive circuit, responsive to receiving the Disable_SR signal, disables the synchronous rectifier.

Example 9. The system of example 8, wherein: the control logic circuit is coupled to the enable cross conduction command to produce an enable cross conduction detection signal; and the cross-conduction detector circuit further comprises, a comparator coupled to the forward node and to receive the threshold voltage, responsive to a voltage at the forward node rising above the threshold voltage to produce a comparator output signal, and an AND gate responsive to receiving the comparator output signal, the enable cross conduction detection signal, and the SR signal produces the Disable_SR signal.

Example 10. The system of example 9, wherein the threshold voltage is selected based on operating parameters of the synchronous rectifier.

Example 11. The system of example 9, wherein: the control logic circuit is coupled to the enable cross conduction command to produce a first enable cross conduction detection (CCD) signal, a second enable CCD signal, and a ZVS signal, wherein the first enable CCD signal enables detection of cross conduction during zero voltage switching of the primary switch using the synchronous rectifier (SR) and the second enable CCD signal enables detection of cross conduction during minimum conduction periods of the synchronous rectifier; and the cross-conduction detector circuit comprises, a comparator coupled to the forward node and responsive to a voltage at the forward node rising above the threshold voltage to produce a comparator output signal, a first AND gate responsive to the comparator output signal, the first enable CCD signal, and the ZVS signal to produce a ZVS Disable signal, a second AND gate responsive to the comparator output signal, the second enable CCD signal, and the SR signal to produce a minimum conduction Disable_SR signal, and an OR gate responsive to the ZVS disable signal and the minimum conduction Disable_SR signal to produce the Disable_SR signal.

Example 12. The system of example 8, wherein the primary controller and the secondary controller are included in a monolithic integrated circuit.

Example 13. The system of example 8, wherein the primary controller and the secondary controller are included in a single integrated circuit package.

Example 14. A method for detecting cross conduction in a power converter having an energy transfer element, a primary switch, and a synchronous rectifier comprises detecting when the synchronous rectifier is conducting; detecting a forward voltage at a forward node of a secondary winding of the energy transfer element; comparing the forward voltage to a selected threshold voltage, wherein a comparison indicates when the primary switch is conducting; detecting cross conduction when the synchronous rectifier is conducting and the primary switch are conducting; and disabling the synchronous rectifier.

Example 15. The method of example 14, wherein the selected threshold voltage is selected from a plurality of voltages indicative of operating parameters of synchronous rectifiers.

Example 16. The method of example 14, wherein the primary switch is conducting during zero voltage switching.

Example 17. The method of example 14, wherein the synchronous rectifier is conducting during a minimum conduction period.

What is claimed is:

1. A control system for a power converter having an energy transfer element, a primary switch, and a synchronous rectifier, the control system comprising:
    a secondary controller comprising:
        a control logic circuit,
        a synchronous rectifier (SR) control/drive circuit coupled to the synchronous rectifier, to the control logic circuit, and to a forward node of the energy transfer element to produce an SR signal to control the synchronous rectifier, and
        a cross conduction detector circuit coupled to the forward node, to the control logic circuit, and to the SR control/drive circuit, wherein the cross conduction detector circuit is configured to:
            detect when the synchronous rectifier is conducting,
            compare a voltage at the forward node to a threshold voltage associated with the primary switch being in a conductive state,
            detect that the primary switch is conducting in response to the comparison indicating that the voltage at the forward node has risen above the threshold voltage,
            detect a cross conduction event responsive to detection that the synchronous rectifier and the primary switch are both conducting, and
            produce a Disable_SR signal responsive to detection of the cross conduction event,
        wherein the SR control/drive circuit is configured to disable the synchronous rectifier responsive to the Disable_SR signal.

2. The control system of claim 1, wherein:
    the control logic circuit is configured to produce an enable cross conduction detection signal; and
    the cross conduction detector circuit comprises:
        a comparator coupled to the forward node, wherein the comparator is configured to produce a comparator output signal responsive to the voltage at the forward node rising above the threshold voltage, and
        an AND gate configured to produce the Disable_SR signal responsive to the comparator output signal, the enable cross conduction detection signal, and the SR signal.

3. The control system as in claim 2, wherein the threshold voltage is selected based on operating parameters of the synchronous rectifier.

4. The control system of claim 1, wherein:
the control logic circuit is configured to produce a first enable cross conduction detection (CCD) signal, a second enable CCD signal, and a zero voltage switching (ZVS) signal, wherein the first enable CCD signal enables detection of cross conduction during zero voltage switching of the primary switch using the synchronous rectifier, and the second enable CCD signal enables detection of cross conduction during minimum conduction periods of the synchronous rectifier; and
the cross conduction detector circuit comprises:
a comparator coupled to the forward node, wherein the comparator is configured to produce a comparator output signal responsive to the voltage at the forward node rising above the threshold voltage,
a first AND gate configured to produce a ZVS Disable signal responsive to the comparator output signal, the first enable CCD signal, and the ZVS signal,
a second AND gate configured to produce a minimum conduction Disable SR signal responsive to the comparator output signal, the second enable CCD signal, and the SR signal, and
an OR gate configured to produce the Disable_SR signal responsive to the ZVS disable signal and the minimum conduction Disable_SR signal.

5. The control system of claim 4, further comprising a primary controller coupled to a primary winding of the energy transfer element and to the control logic circuit, wherein the primary controller and the secondary controller are galvanically isolated.

6. The control system of claim 5, wherein the primary controller and the secondary controller are included in a monolithic integrated circuit.

7. The control system of claim 5, wherein the primary controller and the secondary controller are included in a single integrated circuit package.

8. A system comprising:
an energy transfer element having a primary winding and a secondary winding;
a synchronous rectifier (SR) coupled to a forward node of the energy transfer element at the secondary winding;
a primary controller coupled to the primary winding;
a primary switch coupled to the primary controller and to the primary winding; and
a secondary controller coupled to the secondary winding and to the primary controller, the secondary controller comprising:
a control logic circuit,
an SR control/drive circuit coupled to the synchronous rectifier, to the control logic circuit, and to the forward node to produce an SR signal to control the synchronous rectifier, and
a cross conduction detector circuit coupled to the forward node, to the control logic circuit, and to the SR control/drive circuit, wherein the cross conduction detector circuit is configured to:
detect when the synchronous rectifier is conducting,
compare a voltage at the forward node to a threshold voltage associated with the primary switch being in a conductive state,
detect that the primary switch is conducting in response to the comparison indicating that the voltage at the forward node has risen above the threshold voltage,
detect a cross conduction event responsive to detection that the synchronous rectifier and the primary switch are both conducting, and
produce a Disable_SR signal responsive to detection of the cross conduction event,
wherein the SR control/drive circuit is configured to disable the synchronous rectifier responsive to the Disable_SR signal.

9. The system of claim 8, wherein:
the control logic circuit is configured to produce an enable cross conduction detection signal; and
the cross conduction detector circuit comprises:
a comparator coupled to the forward node, wherein the comparator is configured to produce a comparator output signal responsive to the voltage at the forward node rising above the threshold voltage, and
an AND gate configured to produce the Disable_SR signal responsive to the comparator output signal, the enable cross conduction detection signal, and the SR signal.

10. The system as in claim 9, wherein the threshold voltage is selected based on operating parameters of the synchronous rectifier.

11. The system of claim 8, wherein:
the control logic circuit is configured to produce a first enable cross conduction detection (CCD) signal, a second enable CCD signal, and a zero voltage switching (ZVS) signal, wherein the first enable CCD signal enables detection of cross conduction during zero voltage switching of the primary switch using the synchronous rectifier, and the second enable CCD signal enables detection of cross conduction during minimum conduction periods of the synchronous rectifier; and
the cross conduction detector circuit comprises:
a comparator coupled to the forward node, wherein the comparator is configured to produce a comparator output signal responsive to the voltage at the forward node rising above the threshold voltage,
a first AND gate configured to produce a ZVS Disable signal responsive to the comparator output signal, the first enable CCD signal, and the ZVS signal,
a second AND gate configured to produce a minimum conduction Disable SR signal responsive to the comparator output signal, the second enable CCD signal, and the SR signal, and
an OR gate configured to produce the Disable_SR signal responsive to the ZVS disable signal and the minimum conduction Disable_SR signal.

12. The system of claim 8, wherein the primary controller and the secondary controller are included in a monolithic integrated circuit.

13. The system of claim 8, wherein the primary controller and the secondary controller are included in a single integrated circuit package.

14. A method for detecting cross conduction in a power converter having an energy transfer element, a primary switch, and a synchronous rectifier, the method comprising:
detecting when the synchronous rectifier is conducting;
comparing a voltage at a forward node of the energy transfer element to a threshold voltage associated with the primary switch being in a conductive state,
detecting that the primary switch is conducting in response to the comparison indicating that the voltage at the forward node has risen above the threshold voltage;

detecting a cross conduction event responsive to detecting that the synchronous rectifier and the primary switch are both conducting; and disabling the synchronous rectifier responsive to detecting the cross conduction event.

15. The method of claim 14, wherein the threshold voltage is selected from a plurality of voltages indicative of operating parameters of synchronous rectifiers.

16. The method of claim 14, wherein the primary switch is conducting during zero voltage switching.

17. The method of claim 14, wherein the synchronous rectifier is conducting during a minimum conduction period.

* * * * *